US012595076B2

(12) United States Patent
Bankapur

(10) Patent No.: US 12,595,076 B2
(45) Date of Patent: Apr. 7, 2026

(54) MULTI-MODULE LABORATORY SATELLITES

(71) Applicant: Odyssey SpaceWorks Corp., Brooklyn, NY (US)

(72) Inventor: Shishir Ravindra Bankapur, New York, NY (US)

(73) Assignee: Odyssey SpaceWorks Corp., Brooklyn, NY (US)

( * ) Notice: Subject to any disclaimer, the term of this patent is extended or adjusted under 35 U.S.C. 154(b) by 311 days.

(21) Appl. No.: 18/527,319

(22) Filed: Dec. 3, 2023

(65) Prior Publication Data

US 2024/0182183 A1     Jun. 6, 2024

Related U.S. Application Data

(60) Provisional application No. 63/385,838, filed on Dec. 2, 2022.

(51) Int. Cl.
B64G 1/10      (2006.01)
G01N 35/00      (2006.01)
(52) U.S. Cl.
CPC ....... B64G 1/105 (2013.01); G01N 35/00871 (2013.01); G01N 35/0092 (2013.01)
(58) Field of Classification Search
CPC ............. B64G 1/105; G01N 35/00871; G01N 35/0092
See application file for complete search history.

(56) References Cited

U.S. PATENT DOCUMENTS

| | | | |
|---|---|---|---|
| 2004/0188562 A1* | 9/2004 | Mueller ................ | B64G 1/105 244/10 |
| 2017/0073087 A1* | 3/2017 | Clagett .................... | B64G 1/36 |
| 2024/0204864 A1* | 6/2024 | Voss .................. | H04B 7/18513 |

FOREIGN PATENT DOCUMENTS

WO      WO-2016201193 A1 * 12/2016  ............. G16H 10/40

OTHER PUBLICATIONS

L.J. Aartman et al. "Towards Distributed Control Systems for Experiments Under Microgravity", Conference Record IEEE Instrumentation and Measurement Technology Conference, pp. 320-325 (Year: 1992).*

* cited by examiner

*Primary Examiner* — Natalie Huls
(74) *Attorney, Agent, or Firm* — Fenwick & West LLP

(57) ABSTRACT

A system includes multi-module satellites designed to autonomously or semi-autonomously perform experiments in a space environment for investigators. Each multi-module satellite includes multiple testing modules each associated with a different investigator. Each testing module includes a testing computer that runs experiments. A main flight computer on the multi-module satellite communicates with the testing computers for each module, passing information between the testing computers and a main control system. To perform an experiment in a testing module, the multi-module satellite system collects and stores observation data from sensors of the testing module, controls a controller of the testing module to perform the experiment, transmits the observation data from the testing module to an application associated with the testing module via a main control system, and executes instructions receives from the application via the main control system by controlling the controller of the testing module based on the received instructions.

20 Claims, 5 Drawing Sheets

100

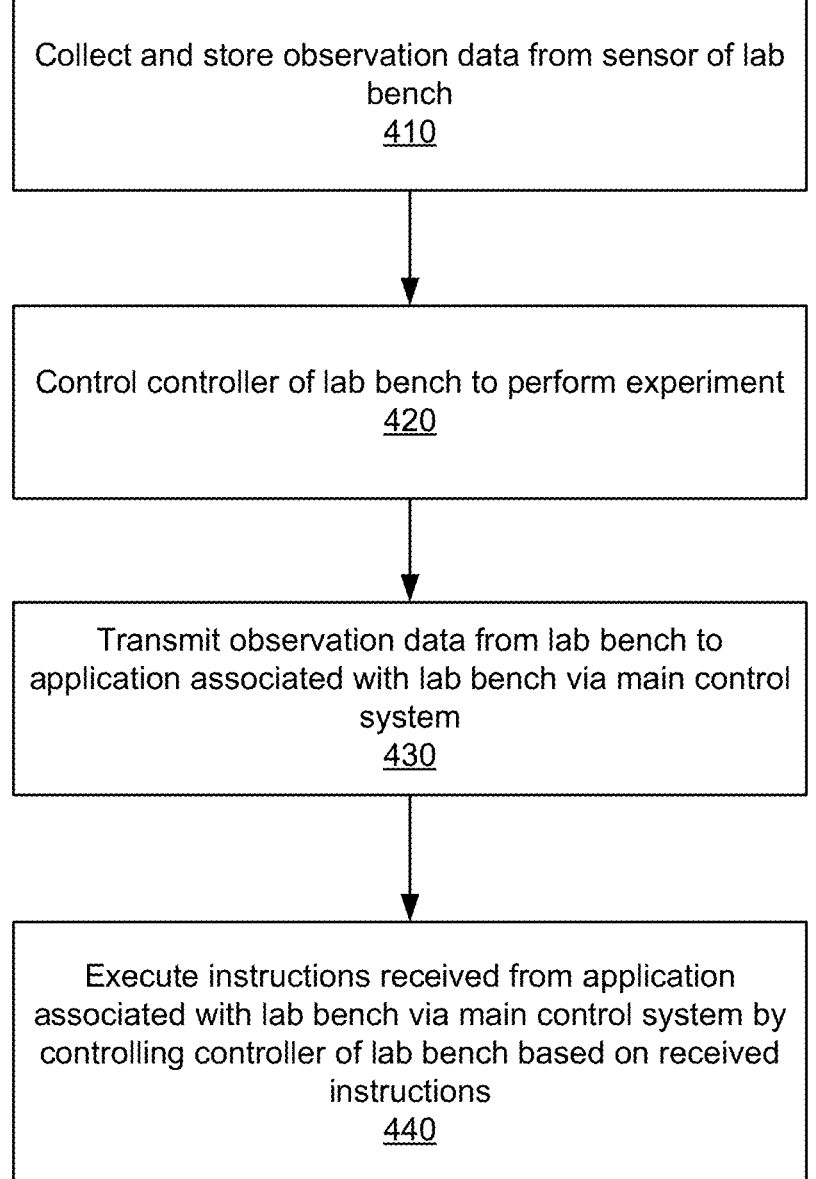

Collect and store observation data from sensor of lab bench
410

Control controller of lab bench to perform experiment
420

Transmit observation data from lab bench to application associated with lab bench via main control system
430

Execute instructions received from application associated with lab bench via main control system by controlling controller of lab bench based on received instructions
440

FIG. 4

Identify conflict in allocating resources to testing
modules of a multi-module satellite system
510

Responsive to identifying a conflict in allocating
resources, extract characteristics of testing modules
520

Prioritize allocating resources to testing modules
based on characteristics of testing modules
530

MULTI-MODULE LABORATORY SATELLITES

CROSS REFERENCE TO RELATED APPLICATIONS

This application claims the benefit of U.S. Provisional Application No. 63/385,838, filed Dec. 2, 2022, which is incorporated by reference in its entirety.

TECHNICAL FIELD

The disclosure generally relates to the field of satellites, in particular multi-module satellites that perform experiments in orbit.

BACKGROUND

Investigators use satellites to conduct experiments in orbit. Generally, each satellite includes materials and equipment to perform a single experiment. While performing experiments in space is a useful scientific venture for investigators with budgets of all sizes, the significant cost associated with building, launching, and maintaining a satellite often prohibits investigators with smaller budgets from being able to perform in-orbit experiments.

SUMMARY

A system includes one or more multi-module satellites designed to autonomously or semi-autonomously perform experiments in a space environment for multiple investigators. Each multi-module satellite includes multiple testing modules, and each testing module runs experiments for a different investigator. The testing modules may be isolated from one another and may each include their own equipment and as well as their own testing computer that runs the experiments for the module. A main flight computer on the multi-module satellite communicates with the testing computers for each module, passing information between the testing computers and a main control system, located on Earth.

To perform an experiment in a testing module, the multi-module satellite system collects and stores observation data from sensors of the testing module, controls a controller of the testing module to perform the experiment, transmits the observation data from the testing module to an application associated with the testing module via a main control system, and executes instructions received from the application via the main control system by controlling the controller of the testing module based on the received instructions.

Additionally, like in any satellite, the multi-module satellite system requires resources to be allocated to different components of the satellite. In a satellite system that runs experiments for a single investigator, resource allocation may be trivial because the investigator may simply determine which components of the satellite system to prioritize over others. However, in a multi-module satellite system, because the system operates different testing modules for different investigators, deciding which testing module to prioritize is more challenging.

To allocate resources, the multi-module satellite system identifies a conflict in allocating resources to testing modules of the multi-module satellite system. In response to identifying a conflict in allocating resources, the multi-module satellite system extracts characteristics of the testing modules. The multi-module satellite system prioritizes allocating resources to testing modules based on the characteristics of the testing modules.

The system of multi-module satellites provides advantages over single-module satellites as it reduces the cost to orbit for any given investigator. The multi-module satellite system allows investigators to share the cost to orbit with other investigators while running isolated experiments.

BRIEF DESCRIPTION OF DRAWINGS

FIG. 4 illustrates a process for performing an experiment in a satellite, in accordance with an embodiment.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Figure 1:
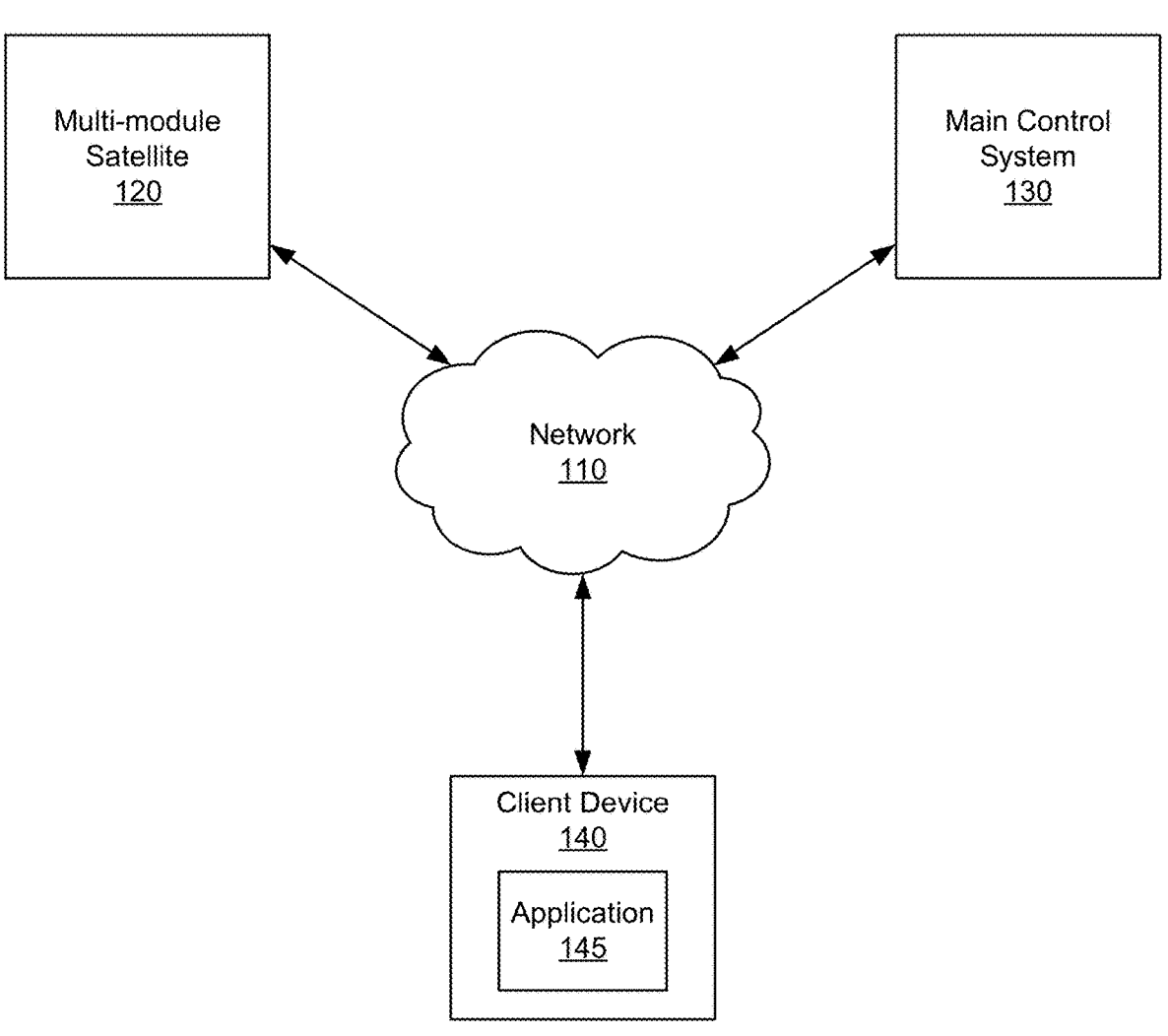
FIG. 1 is a block diagram of a system environment for satellite, in accordance with an embodiment.

FIG. 1 is a high-level block diagram of a system environment 100 for the multi-module satellite 120, in accordance with an embodiment. The system environment 100 shown by FIG. 1 includes a client device 140, a network 110, a multi-module satellite 120, and a main control system 130. In alternative configurations, different or additional components may be included in the system environment 100.

The multi-module satellite 120 includes a payload, instruments, and modules required to autonomously or semi-autonomously perform experiments in a space environment. The multi-module satellite 120 performs normal flight operations, such as launching, orbiting, and returning to Earth. The multi-module satellite 120 may be of a standard, flight-tested form. This allows for ease of launch operations and deployment in orbit using widely used, standardized methods. The multi-module satellite 120 may have a customized form that suits the needs of an experiment. The multi-module satellite 120 may update launch and deployment operations to fit the customized form.

The main control system 130 sends instructions to the multi-module satellite 120 from a location on Earth. For example, the main control system 130 may send the multi-module satellite 120 instructions associated with a particular experiment or module, which the multi-module satellite 120 provides to a testing computer associated with the experiment. As another example, the main control system 130 may send the multi-module satellite 120 instructions for actions related to the satellite as a whole, such as changing position or returning to Earth. The main control system 130 may request or receive information from the multi-module satellite 120, such as experimental data from testing computers of the testing modules, or satellite operating conditions (e.g., power and resource levels, warnings).

The main control system 130 communicates with third-party entities associated with the testing modules of the multi-module satellite 120. A third party-entity, referred to herein as an "investigator," may design experiments for the multi-module satellite 120 to perform inside a testing module. The investigator may supervise the experiments from Earth or from spacecraft in various orbits. The investigator may be an individual or a group of individuals (e.g., members of a university lab group or company). The main control system 130 communicates with investigators through applications 145 on client devices 140.

A client device 140 is a computing device that displays information to users and communicates user actions to the main control system 130. The client device 140 may execute an application 145 allowing a user of the client device 140 (e.g., an investigator) to interact with the main control system 130. For example, the client device 140 can execute a browser application to enable interaction between an investigator using the client device 140 and the main control system 130 via the network 110. Similarly, the client device 140 may interact with the main control system 130 through an application programming interface (API) running on a native operating system of the client device 140, such as IOS® or ANDROID™.

The application 145 allows an investigator to design and manage experiments to be performed in one or more lab benches of modules on the multi-module satellite 120. The application 145 may provide the investigator with a user interface to generate instructions for the experiment for execution by a corresponding module, the instructions including any instruments or steps involved in the experiment. The application 145 may communicate with the main control system 130 to instruct the multi-module satellite 120 to carry out the experiment as desired (e.g., autonomously or non-autonomously). For an experiment carried out non-autonomously, the application 145 may allow the investigator to control the experiment in real time by receiving instructions from the investigator and transmitting the instructions to the main control system 130. The application 145 may request and receive streams of experimental data from the multi-module satellite 120 through the main control system 130 and present the experimental data to the investigator associated with the experiment. The application 145 allows the investigator to format data and export data to local storage of the client device 140 or to third party systems. The application 145 may be accessible by a private network or the public Internet. The application 145 may interact with the main control system 130 though an API such that a user of the application 145 may transmit instructions to the main control system 130 by making API calls.

In some embodiments, an application 145 includes an identifier in instructions for the multi-module satellite 120 so that the instructions are applied to the appropriate module on the satellite. For example, the application 145 may store an identifier associated with an investigator and may include that identifier in instructions sent to the main control system 130 for transmission to the multi-module satellite 120. The main control system 130 may use the identifier to identify which multi-module satellite 120 has the module associated with the instructions and thereby transmit the instructions to the appropriate multi-module satellite 120.

Figure 2:
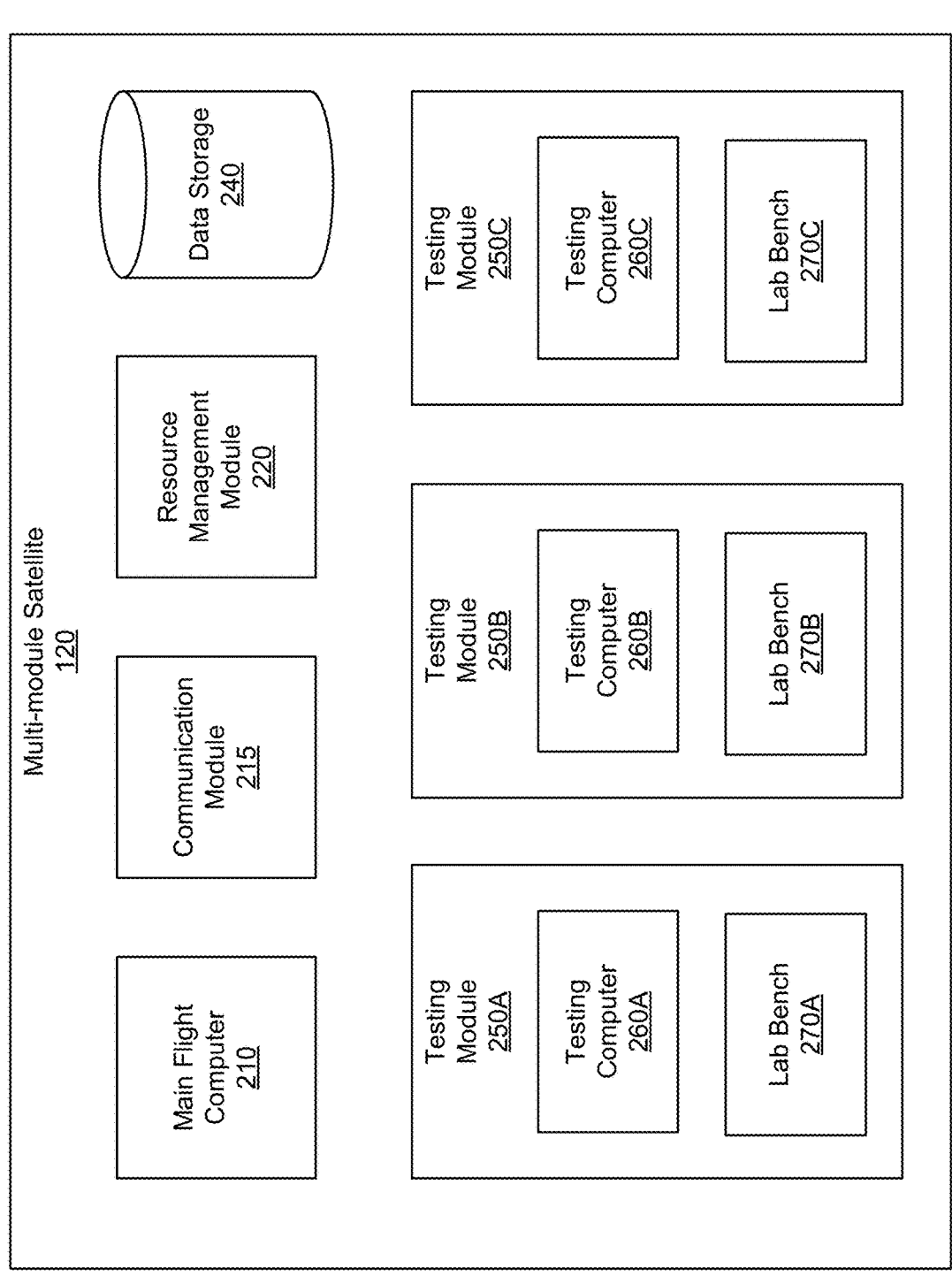
FIG. 2 illustrates exemplary modules operated by a satellite system, in accordance with an embodiment.

FIG. 2 is a block diagram illustrating one embodiment of a multi-module satellite. Alternative embodiments may include more, fewer, or different components, and the functionality of each component may differ from the description below.

As depicted in FIG. 2, the multi-module satellite 120 includes a main flight computer 210, a communication module 215, a resource management module 220, a power source 230, data storage 240, and one or more testing modules 250 (e.g., 250A, 250B, 250C). A testing module 250 includes a testing computer 260 and a lab bench 270. The modules depicted with respect to the multi-module satellite 120 are merely exemplary; fewer or additional modules may be used to achieve the activity disclosed herein. For example, FIG. 2 depicts three testing modules 250A, 250B, and 250C, but the multi-module satellite 120 may include fewer or additional testing modules 250. Moreover, the modules of the multi-module satellite 120 typically reside in the multi-module satellite 120, but in various embodiments may instead, in part or in whole, reside in the main control system 130. In some embodiments, the functionality of the multi-module satellite 120 may in whole or in part be implemented in the main control system 130.

The main flight computer 210 is one or more processing units and manages and coordinates various functions for the multi-module satellite. For example, the main flight computer 210 manages guidance and positioning of the multi-module satellite 120, ensuring that the multi-module satellite 120 remains in the correct orbit with the correct attitude. The main flight computer 210 may operate sensors to detect the position and orientation of the multi-module satellite 120. The main flight computer 210 may compare the detected position and orientation to a desired position and orientation. In response to the detected position and orientation not matching the desired position and orientation, the main flight computer 210 may command actuators to adjust the position and orientation of the multi-module satellite 120.

The main flight computer 210 handles communications between the testing modules 250 of the multi-module satellite 120 and the client device of the investigator. For example, the main flight computer 210 may receive instructions associated with a testing module 250 (e.g., instructions to change the pressure of a lab bench containing the experiment). The communication module 215 identifies to which of the testing modules 250 the instructions apply and passes the instructions to the identified testing module 250. In another example, the communication module 215 may receive experimental data from a testing module 250 and transmit the sensor data to the main control system 130. The communication module 215 may process the data or may transmit the unprocessed sensor data to the main control system 130, where the main control system 130 may perform any further processing.

The communication module 215 manages communications between the multi-module satellite 120 and the main control system 130 through the network 110. The communication module 215 may include various communication equipment or devices (e.g., antennas, transponders, amplifiers, receivers, transmitters, communication devices) to facilitate the receival and transmission of information between the multi-module satellite 120 and the main control system 130.

The resource management module 220 provides resources to modules of the multi-module satellite 120 to be used for conducting experiments in the modules. For example, the resource management module 220 provide resources like power, oxygen, water, or heat to modules of the multi-module satellite 120. The resource management module 220 also may include monitors to monitor resource levels. For example, the resource management module 220 may monitor power consumption of a testing module, power storage in a battery, or power generation from a power source (e.g., solar panels).

The main flight computer 210 allocates resources of the multi-module satellite 120 to the different components of the multi-module satellite 120. For example, during a time period when the multi-module satellite 120 is on the dark side of the Earth, the power source 230 may not generate power, and the main flight computer 210 may reduce the allocation of power to different components of the multi-module satellite 120. The main flight computer 210 ensures that components crucial to operation of the multi-module satellite 120 always have the appropriate amount of resources. For example, the main flight computer 210 allocates sufficient power to ensure that the multi-module satellite remains in the correct orbit or may allocate sufficient power to the communications module 215 that the multi-module satellite 120 can communicate with the main control system 130. However, the main flight computer 210 may reduce the amount of power provide to testing modules 250 or choose which testing modules to power.

In some embodiments, the main flight computer 210 predicts the amount of power each testing module 250 requires based on the power usage for each instrument in the lab bench 270 of the testing module 250. As described with respect to FIG. 3, a lab bench 270 includes instruments and materials that allow for the manipulation and observation of an experiment housed in the lab bench 270. The instruments may be standardized, or "plug-and-play." For a plug-and-play instrument, the main flight computer 210 may have access to a data sheet corresponding to the instrument. A data sheet describes power requirements for an instrument under various operating conditions (e.g., temperature and pressure conditions). As an example, the data sheet may include a minimum power requirement, maximum power requirement, and a typical or average power requirement. The main flight computer 210 predicts the power usage of an instrument based on values in the instrument's data sheet. For example, for a data sheet that describes an instrument requiring a minimum voltage of 4V to operate, a maximum voltage of 6V, and a typical voltage of 5V, the resource management module 220 may predict that the instrument will operate at the typical voltage 5V and use that value to calculate the power consumption (e.g., based on the average current draw, another value that the main flight computer 220 may extract from the instrument's data sheet). The main flight computer 210 may perform this prediction for each standardized instrument in a testing module 250 to predict the overall power consumption of the testing module 250.

For an instrument that is not plug-and-play, the main flight computer 210 may not have the data sheet of the instrument and may thus rely on a different method to predict power usage. In some embodiments, the main flight computer 210 may predict the power usage of an instrument by monitoring the instrument to recognize the power that the component requires to operate. The resource management module 220 may monitor the instrument during operation to determine the amount of power the instrument draws during use.

In some embodiments, the main flight computer 210 predicts the amount of power a testing module 250 will require by executing an instruction set associated with the testing module 250. The investigator for a testing module 250 may create a set of module instructions for the testing module. The instructions may be API functions that the main flight computer 210 may cause to be executed by the testing computer 260 of a testing module 250. For example, the instructions may include a function to activate or deactivate an instrument in the testing module 250, and the main flight computer 210 can use the function to cause the testing computer 260 to activate or deactivate the instrument. In some embodiments, instructions from the main control system 130 correspond to instructions for a testing module 250.

To predict the power consumption of a testing module 250, the main flight computer 210 steps through the instructions of the experiment. At each step in the instructions, the main flight computer 210 monitors the amount of power required for the step based on the instruments used in the step and the environmental conditions of the step (e.g., temperature, pressure). The environmental conditions of the step may merely be a prediction, as the running of the experiment may change the conditions. For example, a step in the instructions may be to increase the temperature of the experiment's environment for one day. This step may require a heat supplying instrument to be powered during the one-day period. The main flight computer 210 may predict the amount of power required to run the heat supplying instrument for one day, for example by using information from the instrument's data sheet or by probing the instrument.

In some embodiments, the main flight computer 210 may predict the amount of power a testing module 250 requires by applying a machine learning model to the set of instructions of the one or more experiments associated with the testing module 250. The main flight computer 210 inputs the instructions for the experiments into the machine learning model and receives, as output from the machine learning model, a predicted power usage of the testing module 250. In some embodiments, the main flight computer 210 may provide the machine learning model with data sheets corresponding to the instruments used in the experiments. Training data for the machine learning model may comprise sets of instructions corresponding to the experiments of a testing module labeled with an amount of power used by the testing module when the testing module ran the experiments in the past.

The main flight computer 210 may perform the above process for any resource that is made available by the resource management module 220. For example, the main flight computer 210 may monitor the oxygen, water, or heating usage of a testing module 250 as the main flight computer 210 cycles through the instructions of a testing module 250 and use the monitored consumption of those resources to predict how the testing module 250 would consume those resources during normal operations.

The main flight computer 210 allocates resources to the testing modules 250 of the multi-module satellite 120 based on the predicted resource usage for each testing module 250. The main flight computer 210 may detect whether, at any given time, there is a conflict in resource allocation. A resource allocation conflict is where the total resource consumption by the testing modules 250 of the multi-module satellite 120, as predicted by the main flight computer 210, exceeds the total resource production or distribution of the multi-module satellite 120. The resource management module 220 may determine whether there is a conflict in real time or may proactively determine whether there will be a conflict in the future. The main flight computer 210 determines whether there is a conflict in resource allocation by comparing the predicted usage of each resource for all the testing modules 250 to the amount of each resource the multi-module satellite 120 is able to provide in total to the testing modules 250. When the multi-module satellite 120 has enough of each resource such that all testing modules 250 may perform their scheduled instructions (e.g., perform experiments), the main flight computer 210 determines that there is no conflict in resource allocation. In response to the determination, the main flight computer 210 allocates resources to all testing modules 250 as needed by the testing modules.

When the multi-module satellite 120 only has enough resources to run some testing modules 250 but not others, the main flight computer 210 determines that there is a conflict in resource allocation. In response to determining a conflict in resource allocation, the main flight computer 210 prioritizes allocating resources to testing modules 250 based on characteristics of the testing modules 250. In some embodiments, the main flight computer 210 prioritizes allocating resources to testing modules 250 with biological experiments or where the instructions are time sensitive. For example, say a first lab bench 270 runs an experiment that tests operation of a space camera, where photos may be taken at any time. Say a second lab bench 270 runs an experiment where heat must be applied to bacteria for the entire duration of the experiment. In this example, the main flight computer 210 may prioritize allocating resources (e.g., power) to the second lab bench 270, as the experiment is both biological in nature and includes time sensitive instructions.

The one or more testing modules 250 perform experiments designed by investigators. Experiments may be biological or non-biological in nature. For example, a biological experiment may be to grow a cancer tumor while a non-biological experiment may be to test how different paints protect an instrument against radiation. Each testing module 250 that performs an experiment may be associated with the investigator that designed the experiment. In some embodiments, a testing module 250 may house multiple experiments for the same investigator. Each testing module 250 includes a testing computer 260 that manages the operations for the experiments of the testing module 250 and communicates with the communication module 215. Each testing module 250 includes one or more lab benches 270 that house equipment and materials needed to perform experiments. Each testing module 250 may be isolated from other testing modules 250 in the multi-module satellite 120 such that there is no cross-contamination of information or materials between testing modules 250 associated with different investigators.

The testing computer 260 of a testing module 250 operates the one or more lab benches 270 of the testing module 250. The testing computer 260 may include a computer processing unit coupled to each lab bench 270. The testing computer 260 receives instructions corresponding to the one or more lab benches 270 it operates. The instructions outline how the one or more experiments associated with the lab bench 270 should be run. The instructions may include information on instruments used in the experiments, conditions of the experiments, and timing of the experiments. For example, for a biological experiment, an instruction may be to apply a particular temperature to an environment surrounding a cell culture for a set amount of time (e.g., one day). The testing computer 260 may receive the instructions from communication module 215. In some embodiments, the testing computer 260 may have a set of APIs that enable interaction between the testing computer 260 and the main control system 130 directly. In some embodiments, the testing computer 260 may receive instructions for an experiment prior to starting the experiment (e.g., before launch of the multi-module satellite 120). In other embodiments, the testing computer 260 may receive instructions in real-time as the experiment is running in orbit. The testing computer 260 communicates with each lab bench 270 to control the experiment within the lab bench 270 according to the instructions. The testing computer 260 may receive feedback from the lab bench 270. For example, the testing computer 260 may receive feedback in the form of data collected by a sensor in the lab bench 270 that describes the conditions of the environment of the experiment. In some embodiments, the testing computer 260 receives commands to supply or cut off power to a lab bench 270.

A lab bench 270 includes materials and equipment needed to conduct an experiment. The lab bench 270 may include materials and equipment for one or more experiments for one or more different investigators. The lab bench 270 may be a closed loop system such that any one lab bench 270 is isolated from other lab benches 270. Isolated lab benches 270 limit cross-contamination of materials or information between experiments. In some embodiments, the lab benches 270 may not be totally isolated and instead may connect or communicate with one another. Connected lab benches 270 allow information or materials from one portion of the experiment to be passed to another portion of the experiment. For example, for an experiment with multiple portions, each portion may reside in a different lab bench 270, and each lab bench 270 may be configured to pass information from one to another. The components of a lab bench are further described with respect to FIG. 3.

Figure 3:
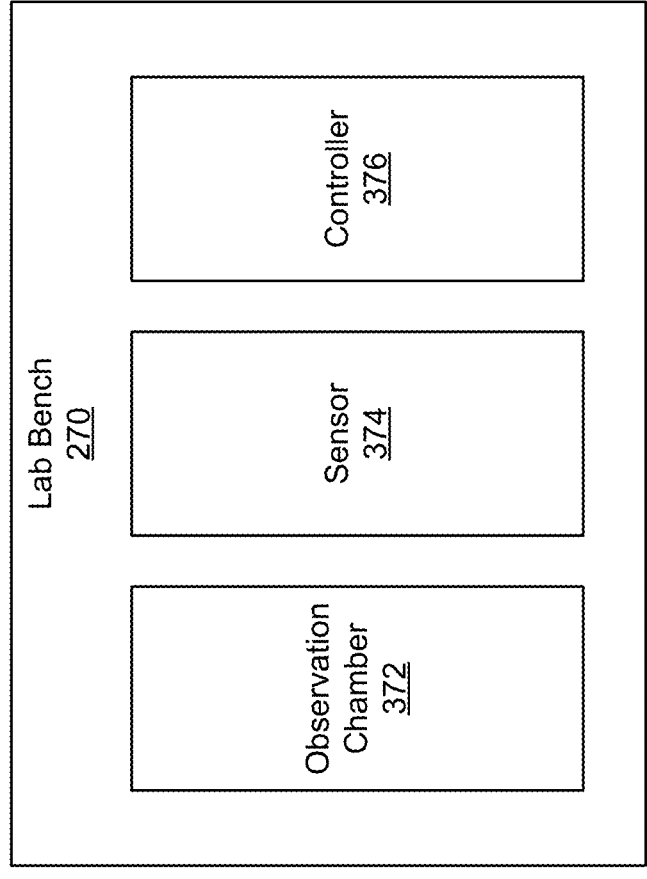
FIG. 3 illustrates an exemplary lab bench, in accordance with an embodiment.

FIG. 3 is a block diagram illustrating one embodiment of an exemplary lab bench. As depicted in FIG. 3, the lab bench 270 includes an observation chamber 372, a controller 376, and a sensor 374.

The observation chamber 372 of the lab bench 270 includes instruments and materials for the manipulation and observation of experiments. The instruments may be standardized, or "plug-and-play." Plug-and-play instruments enable investigators to easily initiate experiments without the need for significant set up or configuration (e.g., ensuring communication between different components, providing the correct power level). Plug-and-play instruments also ensure that experiments are reliable and repeatable without the need for additional engineering. In some embodiments, plug-and-play instruments include instruments that are commercially available for laboratory experiments. For example, a plug-and-play instrument may be a beaker, containment chamber, stirrer, or heating element. Plug-and-play instruments may also include specialized versions of commercially available instruments. For example, a plug-and-play instrument may be an instrument made with temperature or impact resistant materials. Plug-and-play instruments may be shaped such that they may be used in the lab bench 270. For example, beakers may be shaped such that they may be gripped more easily by control systems of the lab bench 270 (e.g., the controller 376) or such that they fit more easily within the confined space of the lab bench 270. In some embodiments, the observation chamber 372 may contain highly specialized instruments designed for unique one-off applications or instruments specific to the investigator associated with the experiment in the lab bench 270. For example, the observation chamber 374 may include an instrument than an investigator is testing the operation of in a space environment (e.g., a space camera). The instruments and materials of the observation chamber 372 may vary depending on the experiment. For example, for a biological experiment, the observation chamber 372 may include cell cultures, various chambers (e.g., culture wells, scaffolds, media reservoirs, and sorting manifolds) and instruments (e.g., pumps and centrifuges). Other instruments may include, but are not limited to reactors, microfluidics devices, lab-on-a-chip, etc.

The lab bench 270 may include one or more sensors 374. A sensor 374 may be an instrument that measures conditions associated with the experiment in the observation chamber 372. The sensor 374 may be any type of sensor that may measure any type of data related to the experiment. For example, the sensor 374 may be a recording device that measures audio data, a camera that records image data, a thermistor that measures temperature data, or an oscilloscope that measures signal data. In another example, for a biological experiment including a cell culture, the sensor 374 may take temperature measurements, optical measurements, and images of the cell culture layer. The sensor 374 may transmit or stream data to the testing computer 260. The testing computer 260 may log the data in the data storage 220 or communicate with the communication module 215 to transmit the data to the main control system 130.

The controller 376 of the lab bench 270 controls the instruments of the observation chamber 372. The controller 376 may control the instruments to regulate the environment of the observation chamber 372. For example, the controller 376 may regulate the temperature, humidity, and pressure of the observation chamber by instructing instruments to perform actions such as spreading heat or releasing oxygen gas. The controller 376 controls the instruments of the observation chamber 372 to manipulate and carry out experiments in orbit. In some embodiments, the controller 376 may receive a set of instructions corresponding to an experiment. The instructions may indicate the steps of the experiment and any necessary conditions. The controller 376 may autonomously carry out the experiment by stepping through the instructions and operating instruments or changing conditions accordingly. In some embodiments, the controller 376 may run fully autonomously, carrying out the instructions without additional input. In some embodiments, the controller 376 may receive input from investigators during the experiment in the form of changes to the instructions. In some embodiments, the controller 376 may receive data from the sensor 374 and change the experimental conditions based on the data. For example, for an experiment with instructions indicating the pressure should be 600 hPa in the lab module 270, in response to receiving data indicating that the pressure is 700 hPa, the controller 376 may take action to lower the pressure in the lab module 270. The controller 376 may change the experimental conditions based on the received data.

Performing an Experiment in a Satellite

Referring now to FIG. 4, illustrated is a process for performing an experiment in a satellite. The process of FIG. 4 may be performed by the testing computer 260 of the multi-module satellite 120.

The testing computer 260 collects and stores 410 observation data from the sensor 374 of the lab bench 270. The sensor 374 may be one or more sensors that record one or more types of data. The testing computer 260 may operate the sensors 374 constantly or during specific portions of experiments. For example, the testing computer 260 may operate a temperature sensor 374 during the entirety of an experiment while only operating a camera at the beginning and end of the experiment. The testing computer 260 may store the data in the data storage 220.

The testing computer 260 controls 420 the controller 376 of the lab bench 270 to perform an experiment. The testing computer 260 controls the controller 376 to step through the instructions of the experiment and operate instruments or change conditions accordingly.

The testing computer 260 transmits 430 observation data from the lab bench 270 to the application 145 associated with the lab bench 270 via the main control system 130. The testing computer 260 may communicate with the operations module 210 to use a combination of antennas, transponders, amplifiers, receivers, or transmitters to transmit data to the main control system 130. The main control system 130 may, through an API, transmit the data to the application 145 of the client device 140.

The testing computer 260 executes 440 instructions received from the application 145 associated with the lab bench 270 via the main control system 130 by controlling the controller 376 of the lab bench 270 based on the received instructions. The testing computer 260 may receive instructions from the main control system 130, the instructions coming from the application 145. The testing computer 260 executes the instructions by controlling the controller 376 to step through the received instructions and operate instruments or change conditions accordingly.

Resource Allocation

Figure 5:
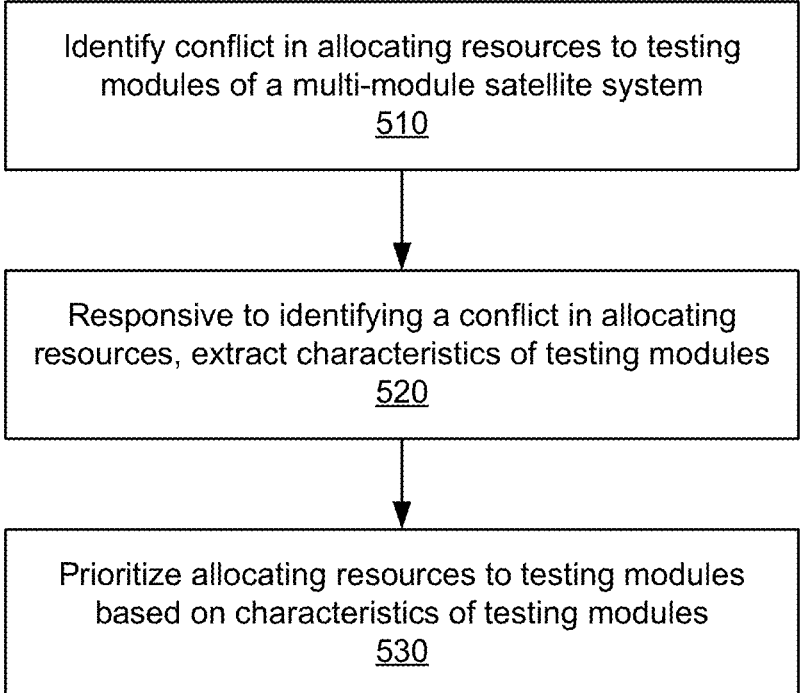
FIG. 5 illustrates a process for allocating resources to testing modules in a satellite, in accordance with an embodiment.

Referring now to FIG. 5, illustrated is a process for allocating power to testing modules in a satellite. The process of FIG. 5 may be performed by the resource management module 220 of the multi-module satellite 120.

The resource management module 220 identifies 510 a conflict in allocating power to testing modules 250 of a multi-module satellite system 120. The resource management module 220 determines whether there is a conflict in power allocation by comparing the predicted power usage for all the testing modules 250 to the amount of stored power reserved for testing modules (e.g., total stored power minus power needed for crucial flight and communication operations). For example, for a multi-module satellite 120 that requires 100 W of power at a given time, 20 W of which are needed for crucial flight and communication operations, the resource management module 220 may allocate 80 W to testing modules 250. If the resource management module 220 were to predict that the testing modules 250 to use more than 80 W of power (e.g., 90 W), the resource management module 220 determines that there is a conflict in power allocation. If the resource management module 220 were to predict that the testing modules 250 to use less than or exactly 80 W of power, the resource management module 220 determines that there is no conflict in power allocation.

In response to determining that there is a conflict in power allocation, the resource management module 220 extracts 520 characteristics of each testing module 250. Characteristics of each testing module 250 may be characteristics of the one or more experiments of each testing module. Characteristics may include whether the testing module 250 includes a biological or non-biological experiment or whether the testing module 250 includes a time-sensitive experiment.

The resource management module 220 prioritizes 530 allocating resources to testing modules 250 based on the characteristics of the testing modules 250. For example, the resource management module 220 may prioritize allocating power to testing modules 250 with biological experiments or where the instructions are time sensitive.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium and processor executable) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module is a tangible component that may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Upon reading this disclosure, those of skill in the art will appreciate still additional alternative structural and functional designs for a system and a process for performing an experiment on a satellite through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. An multi-module laboratory satellite system comprising:

a plurality of lab benches, wherein each lab bench comprises:

an observation chamber within which an experiment is performed;

a controller comprising instruments for performing the experiment within the observation chamber; and a sensor configured to collect data describing the experiment performed within the observation chamber;

a communication device configured to communicate with a main control system;

a testing computer comprising a computer processing unit coupled to each of the plurality of lab benches; and a non-transitory computer-readable medium storing instructions that, when executed by the testing computer, cause the testing computer to:

collect and store observation data from a sensor of a lab bench;

control a controller of a lab bench to perform the experiment for the lab bench;

transmit observation data from a lab bench to an application associated with the lab bench via the main control system; and execute instructions received from an application associated with a lab bench via the main control system by controlling the controller of the lab bench based on the received instructions.

2. The multi-module laboratory satellite system of claim 1, wherein the instructions further comprise instructions to, for each lab bench of the plurality of lab benches, predict a resource usage of a lab bench by simulating a run of the instructions received from the application associated with the lab bench via the main control system.

3. The multi-module laboratory satellite system of claim 2, wherein the instructions further comprise instructions to allocate resources to each lab bench based on the predicted resource usage of the plurality of lab benches.

4. The multi-module laboratory satellite system of claim 2, wherein the instructions further comprise instructions to:

determine whether resource usage is above a threshold resource usage; and responsive to determining that the resource usage is above a threshold resource usage, allocate resources to lab benches with biological experiments.

5. The multi-module laboratory satellite system of claim 2, wherein the instructions to predict a resource usage of a lab bench comprise instructions to:

input instructions received from the application associated with the lab bench into a machine learning model; and receive, as output from the machine learning model, usage requirements for the lab bench.

6. The multi-module laboratory satellite system of claim 1, wherein the instructions received from an application associated with a lab bench via the main control system are received via an application programming interface (API).

7. The multi-module laboratory satellite system of claim 1, wherein the experiment comprises a biological experiment.

8. A non-transitory computer-readable medium storing instructions that, when executed by a processor, cause the processor to: collect and store observation data from a sensor of a lab bench of an multi-module laboratory satellite system, wherein the multi-module laboratory satellite system comprises a plurality of lab benches, a communication device configured to communicate with a main control system, and a testing computer comprising a computer processing unit coupled to each of the plurality of lab benches, wherein each of the plurality of lab benches comprises: an observation chamber within which an experiment is performed; a controller comprising instruments for performing the experiment within the observation chamber; and a sensor configured to collect data describing the experiment performed within the observation chamber; control a controller of the lab bench to perform the experiment for the lab bench; transmit observation data from the lab bench to an application associated with the lab bench via the main control system; and execute instructions received from an application associated with a lab bench via the main control system by controlling the controller of the lab bench based on the received instructions.

9. The non-transitory computer-readable medium of claim 8, wherein the instructions further comprise instructions to, for each lab bench of the plurality of lab benches, predict a resource usage of a lab bench by simulating a run of the instructions received from the application associated with the lab bench via the main control system.

10. The non-transitory computer-readable medium of claim 9, wherein the instructions further comprise instructions to allocate resources to each lab bench based on the predicted resource usage of the plurality of lab benches.

11. The non-transitory computer-readable medium of claim 9, wherein the instructions further comprise instructions to:

determine whether resource usage is above a threshold resource usage; and responsive to determining that the resource usage is above a threshold resource usage, allocate resources to lab benches with biological experiments.

12. The non-transitory computer-readable medium of claim 9, wherein the instructions to predict a resource usage of a lab bench comprise instructions to:

input instructions received from the application associated with the lab bench into a machine learning model; and receive, as output from the machine learning model, usage requirements for the lab bench.

13. The non-transitory computer-readable medium of claim 8, wherein the instructions received from an application associated with a lab bench via the main control system are received via an application programming interface (API).

14. The non-transitory computer-readable medium of claim 8, wherein the experiment comprises a biological experiment.

15. A method for performing an experiment on a satellite, comprising: collecting and storing observation data from a sensor of a lab bench of an multi-module laboratory satellite system, wherein the multi-module laboratory satellite system comprises a plurality of lab benches, a communication device configured to communicate with a main control system, and a testing computer comprising a computer processing unit coupled to each of the plurality of lab benches, wherein each of the plurality of lab benches comprises: an observation chamber within which an experiment is performed; a controller comprising instruments for performing the experiment within the observation chamber; and a sensor configured to collect data describing the experiment performed within the observation chamber; controlling a controller of the lab bench to perform the experiment for the lab bench; transmitting observation data from the lab bench to an application associated with the lab bench via the main control system; and executing instructions received from an application associated with a lab bench via the main control system by controlling the controller of the lab bench based on the received instructions.

16. The method of claim 15, further comprising, for each lab bench of the plurality of lab benches, predicting a resource usage of a lab bench by simulating a run of the instructions received from the application associated with the lab bench via the main control system.

17. The method of claim 16, further comprising allocating resources to each lab bench based on the predicted resource usage of the plurality of lab benches.

18. The method of claim 16, further comprising:

determining whether resource usage is above a threshold resource usage; and responsive to determining that the resource usage is above a threshold resource usage, allocating resources to lab benches with biological experiments.

19. The method of claim 16, wherein predicting a resource usage of a lab bench comprises:

inputting instructions received from the application associated with the lab bench into a machine learning model; and receiving, as output from the machine learning model, usage requirements for the lab bench.

20. The method of claim 15, wherein the instructions received from an application associated with a lab bench via the main control system are received via an application programming interface (API).

\* \* \* \* \*